(12) United States Patent
Leith

(10) Patent No.: US 6,684,736 B2
(45) Date of Patent: *Feb. 3, 2004

(54) MULTI-PIECE CRANKSHAFT CONSTRUCTION

(76) Inventor: Donald G. Leith, 7114 S. Elder Ct., West Bloomfield, MI (US) 48324

( * ) Notice: Subject to any disclaimer, the term of this patent is extended or adjusted under 35 U.S.C. 154(b) by 0 days.

This patent is subject to a terminal disclaimer.

(21) Appl. No.: 09/955,875

(22) Filed: Oct. 26, 2001

(65) Prior Publication Data

US 2002/0046625 A1 Apr. 25, 2002

Related U.S. Application Data

(60) Continuation-in-part of application No. 09/533,917, filed on Mar. 23, 2000, now Pat. No. 6,318,443, which is a division of application No. 09/065,155, filed on Apr. 23, 1998, now Pat. No. 6,173,628.

(51) Int. Cl.$^7$ .............................. F16C 3/04; B23P 17/00
(52) U.S. Cl. ............................ 74/603; 74/595; 74/597; 74/598; 29/888.08; 403/242
(58) Field of Search ................. 74/595–604; 29/888.08, 29/464; 403/242

(56) References Cited

U.S. PATENT DOCUMENTS

| | | | |
|---|---|---|---|
| 2,364,109 A | 12/1944 | Taylor | 29/6 |
| 4,191,238 A | 3/1980 | Pichl | 164/100 |
| 4,265,388 A | 5/1981 | Takahashi et al. | 228/135 |
| 4,319,498 A | 3/1982 | McWhorter | 74/595 |
| 4,382,390 A | 5/1983 | Jordan | 74/567 |
| 4,386,859 A * | 6/1983 | Andrione et al. | 384/420 |
| 4,406,590 A | 9/1983 | Kessler | 417/360 |
| 4,493,226 A | 1/1985 | Andrione et al. | 74/598 |
| 4,494,286 A | 1/1985 | Kaufman | 29/156.5 A |
| 4,509,378 A | 4/1985 | Brown | 74/44 |
| 4,580,956 A * | 4/1986 | Takahashi et al. | 418/14 |
| 4,597,365 A | 7/1986 | Madaffer | 123/90.6 |
| 4,624,156 A * | 11/1986 | Kamata | 74/595 |
| 4,641,546 A | 2/1987 | Mettler | 74/598 |
| 4,730,512 A | 3/1988 | Ito et al. | 74/595 |
| 4,829,642 A | 5/1989 | Thomas et al. | 29/6 |
| 4,829,954 A | 5/1989 | Morgado | 123/193 P |
| 4,835,832 A | 6/1989 | Arnold et al. | 29/523 |
| 4,838,116 A | 6/1989 | Saito et al. | 74/595 |

(List continued on next page.)

FOREIGN PATENT DOCUMENTS

| | | | |
|---|---|---|---|
| DE | 364371 | 11/1922 | |
| DE | 422828 | 12/1925 | |
| DE | 542056 | 1/1932 | |
| DE | 663563 | 8/1938 | |
| DE | 822036 | 11/1951 | |
| DE | 891641 | 10/1953 | |
| DE | 1270893 | 6/1968 | |
| EP | 0 530 890 A1 | 3/1993 | F16C/3/10 |
| FR | 763668 | 5/1934 | 5/3 |
| GB | 2 168 458 | 6/1986 | |
| JP | 2-180308 | 7/1990 | |
| JP | 10-169638 | 6/1998 | |

Primary Examiner—Vinh T. Luong
(74) Attorney, Agent, or Firm—Gifford, Krass, Groh, Sprinkle, Anderson & Citkowski, P.C.

(57) ABSTRACT

A multi-piece crankshaft having a shaft with two ends, an axis and adapted to rotate about its axis. A crankpin also has two ends and an axis parallel to but spaced radially outwardly from the shaft axis. The crankpin optionally has at least one indentation. A plate has two spaced openings such that one end of the shaft is positioned in one of the plate openings while the other end of the shaft is positioned in the other plate opening. At least one counterweight extends between said one end of the shaft and said one end of the crankpin, and this counterweight is formed by casting a liquid metal around the ends of the shaft and the crankpin as well as around the plate. The liquid metal fills the at least one indentation and, upon hardening, locks the counterweight to the crankpin and shaft and encases the plate.

6 Claims, 5 Drawing Sheets

U.S. PATENT DOCUMENTS

| | | | |
|---|---|---|---|
| 4,881,427 A | 11/1989 | Yasutake | 74/603 |
| 4,922,993 A | 5/1990 | Matsuo et al. | 164/104 |
| 5,038,847 A | 8/1991 | Donahue et al. | 164/112 |
| 5,088,345 A | 2/1992 | Kemmler et al. | 74/598 |
| 5,199,318 A | 4/1993 | Hudson | 74/595 |
| 5,203,230 A | 4/1993 | Distelrath | 74/595 |
| 5,207,120 A | 5/1993 | Arnold et al. | 74/595 |
| 5,293,684 A | 3/1994 | Fry | 29/888.08 |
| 5,348,210 A * | 9/1994 | Linzell | 228/115 |
| 5,495,885 A | 3/1996 | Fowlkes et al. | 164/98 |
| 5,737,976 A | 4/1998 | Haman | 74/579 E |
| 5,857,915 A | 1/1999 | Leith | 464/179 |
| 5,983,752 A | 11/1999 | Wahlstrom | 74/603 |
| 6,089,840 A * | 7/2000 | Iizuka et al. | 418/55.5 |
| 6,173,628 B1 | 1/2001 | Leith | 74/598 |
| 6,314,643 B1 | 11/2001 | Leith | 29/888.08 |
| 6,382,298 B2 | 5/2002 | Leith et al. | 164/98 |
| 2003/0024347 A1 * | 2/2003 | Leith | 74/595 |

\* cited by examiner

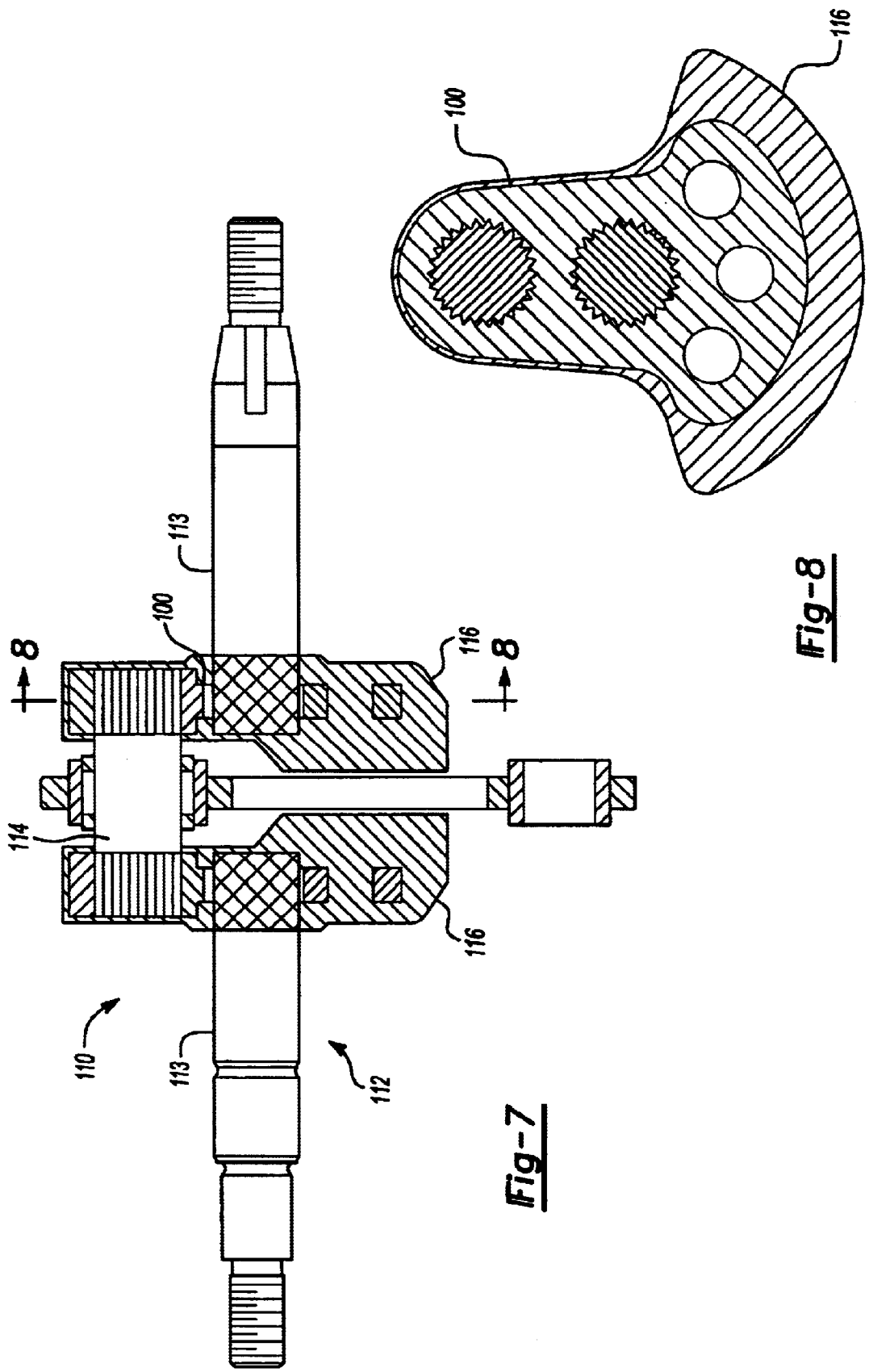

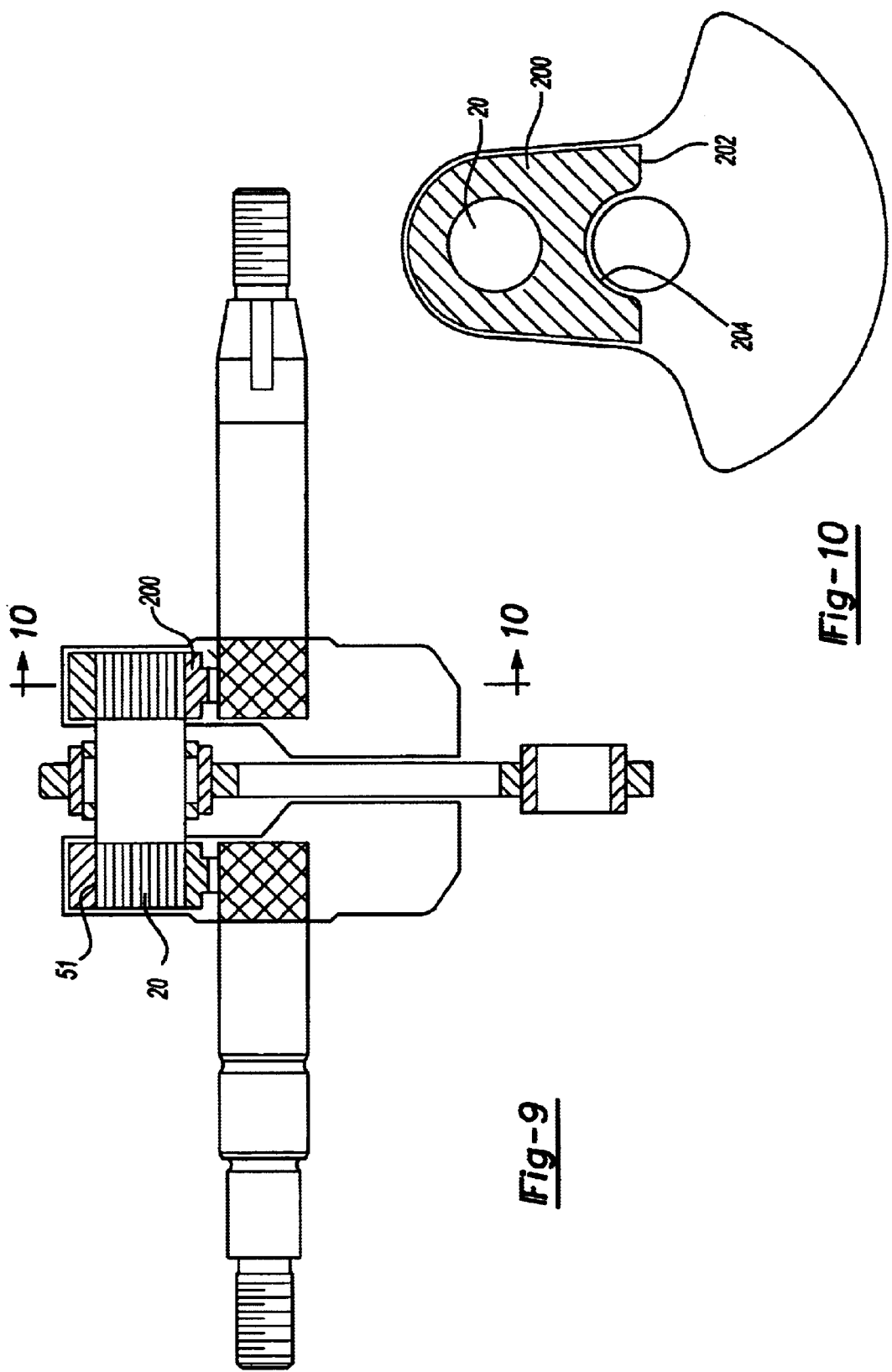

MULTI-PIECE CRANKSHAFT CONSTRUCTION

CROSS-REFERENCE TO RELATED APPLICATIONS

This application is a continuation-in-part of U.S. patent application Ser. No. 09/533,917 filed Mar. 23, 2000, now U.S. Pat. No. 6,318,443 issued on Nov. 20, 2001 which is a divisional of U.S. patent application Ser. No. 09/065,155 filed Apr. 23, 1998, now U.S. Pat. No. 6,173,628 issued Jan. 16, 2001, and entitled "Multi-Piece Crankshaft Construction".

BACKGROUND OF THE INVENTION

I. Field of the Invention

The present invention relates generally to crankshafts and, more particularly, to a method and apparatus for constructing a multi-piece crankshaft.

II. Description of the Prior Art

In a conventional crankshaft, the crankshaft includes a segmented main shaft having an axis aligned with the axis of rotation of the crankshaft. One or more crankpins are also provided at a position radially spaced from, but parallel to, the main shaft. The piston is then secured to each crankpin which rotatably drives the crankshaft about its axis of rotation.

Since the crankpins are radially offset from the axis of rotation of the crankshaft and attached to a piston, counterweights are conventionally provided for securing the main shaft to the crankpin so that the overall weight of the crankshaft has a balanced rotation. In many previously known crankshafts, the entire crankshaft is made from a single heavy body of cast metal which is then machined so that the main shaft, crankpins and counterweights are of a one-piece construction. Machining such crankshafts, however, is necessarily expensive which increases the overall cost of the crankshaft.

There have, however, been crankshafts which are constructed from multiple pieces for low cost construction. Such crankshafts are oftentimes used in small two cycle engines although they can also be used in other types of engines or compressors.

Typically, in these multi-piece crankshafts, the counterweights are constructed from an inexpensive material, such as powdered metal or steel stampings, and the counterweight has holes formed through it corresponding to the position of the crankpin and main shaft. The crankpin and main shaft are then constructed from conventional round stock. The ends of the main shaft and crankpin are knurled, splined or otherwise deformed and pressed into the openings formed in the counterweight to thereby form the crankshaft.

One primary disadvantage of these previously known multi-piece crankshafts is that the main shaft and crankpins must be parallel to each other within very high tolerances. However, during the pressing operation, the main shaft and crankpins often become skewed relative to each other and the resulting crankpin assembly must be either corrected by bending the crankpin and main shaft relative to each other or, in some cases, discarded as scrap. Furthermore, these prior art crankshafts are also subject to failure from push out and twisting of the shaft relative to the counterweight.

SUMMARY OF THE PRESENT INVENTION

The present invention provides a multi-piece crankshaft assembly and method for making the same which overcomes all of the above-mentioned disadvantages of the previously known multi-piece crankshaft constructions.

In brief, the crankshaft assembly of the present invention comprises a crankpin and main shaft, both of which are cylindrical in cross-sectional shape. One end of the main shaft includes an indentation, such as a spline, knurl or the like. Optionally, one or both ends of the crankpin also include an indentation.

A multi-piece crankshaft of the present invention further includes a generally planar reinforcing plate constructed of a high strength material, such as steel. This plate, furthermore, includes a first and second throughbore which are spaced from each other.

One end of the crankshaft is press fit into one of the openings of the plate so that the plate lies in a, plane generally perpendicular to the axis of the crankpin. The cross-sectional size and shape of the other plate opening, however, is larger than the end of the main shaft. Thus, when the end of the main shaft is positioned within the second plate opening, a clearance exists between the second plate opening and the end of the main shaft.

The crankpin and main shaft are then positioned in cylindrical positioning recesses in a mold having a mold cavity corresponding to the desired shape of the counterweight. Furthermore, with the crankpin positioned within its positioning recess, the plate is disposed within the mold cavity. Similarly, with the main shaft positioned within its positioning recess in the mold, one end of the main shaft is positioned through the second opening in the plate.

In practice, the positioning recesses of the mold are machined with high precision which ensures parallelism between the main shaft and crankpin once the main shaft and crankpin are positioned within their positioning recesses. Likewise, the radial spacing between the crankpin and main shaft is maintained with a high degree of precision.

With the crankpin, main shaft and plate positioned within the mold as described above, the mold cavity corresponding to the counterweight is then filled by pouring, injection or the like with a liquid heat setting material, such as zinc. This liquid material not only fills the mold cavity, but also the indentations in either or both of the crankpin and the main shaft as well as through openings preferably formed in the plate. Consequently, upon hardening of the material, the material fills the indentations in one or both of the crankpin and main shaft thus precluding either rotation or longitudinal movement between the counterweight and both the crankpin and main shaft.

Since the main shaft and crankpin axe maintained parallel to each other with a high degree of precision, once the liquid material has set, parallelism between the crankpin and main shaft is established for the completed crankshaft assembly. Furthermore, since this liquid material also encases the plate, the plate increases the overall structural strength of the counterweight over that obtainable from the heat setting material alone.

In a further embodiment of the invention, one end of the crankpin is press fit into one end of the plate while the other end of the plate terminates short of the main shaft.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 7 is a longitudinal sectional view illustrating a modification of the preferred embodiment of the present invention;

FIG. 8 is a view taken substantially along line 8—8 in FIG. 7;

FIG. 9 is a longitudinal sectional view of a further embodiment of the invention; and FIG. 10 is a view taken along line 10—10 in FIG. 9.

DETAILED DESCRIPTION OF A PREFERRED EMBODIMENT OF THE PRESENT INVENTION

Figure 1:
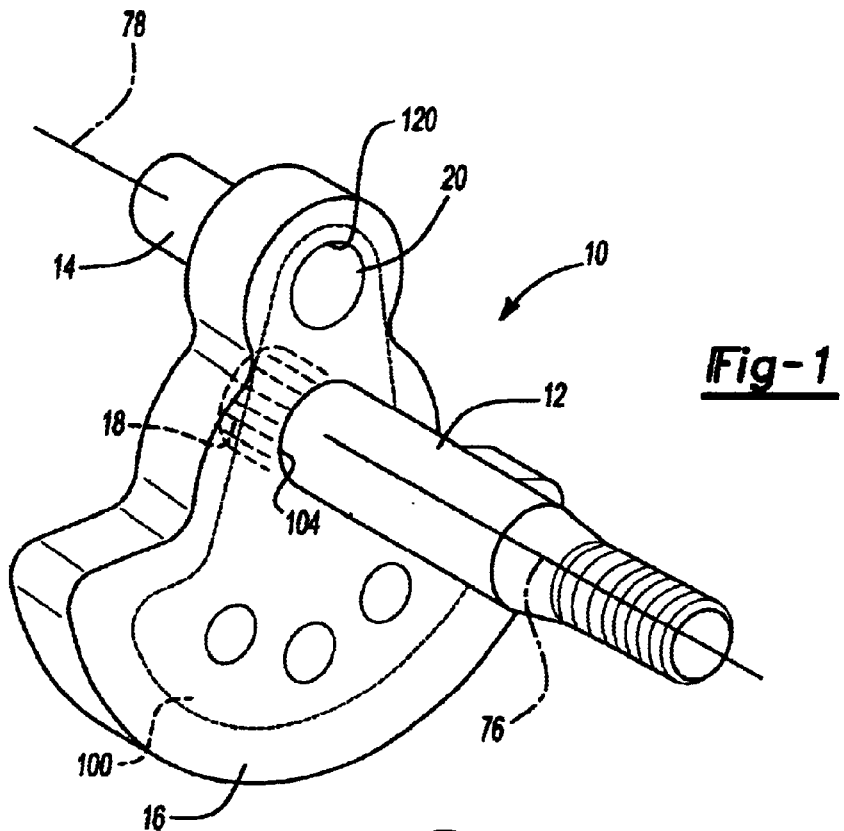
FIG. 1 is an elevational view illustrating a preferred embodiment of the present invention.

With reference first to FIG. 1 a preferred embodiment of a crankshaft 10 of the present invention is there shown and comprises an elongated main shaft 12 adapted to rotate about its longitudinal axis 76. The crankshaft 10 further includes a crankpin 14 having a longitudinal axis 78 parallel to but spaced radially from the axis 76 of the main shaft 12.

Still referring to FIG. 1 a counterweight 16 extends between one end 18 of the main shaft 12 and one end 20 of the crankpin 14. The counterweight 16 secures the crankpin 14 and main shaft 12 together.

Figure 2:
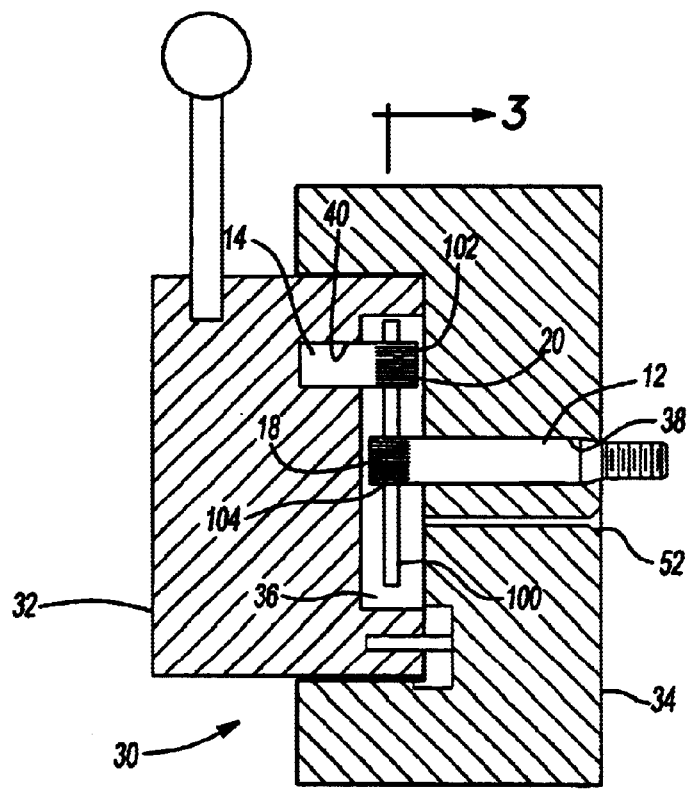
FIG. 2 is a sectional view illustrating a step in constructing the preferred embodiment of the present invention.

With reference now to FIGS. 1 and 2, a reinforcing plate 100 is contained within the interior of the counterweight 16. This plate 100 includes a first throughbore 102 through which the first end 20 of the crankpin 14 extends. The plate 102 also includes a second throughbore 104 through which the end 18 of the main shaft 12 extends.

Preferably, the plate opening 102 is dimensioned so that it is smaller in size than the end 20 of the crankpin 14. Consequently, the end 20 of the crankpin 14 is press fit into the opening 102 to secure the plate 100 to the crankpin 14 such that the plate lies in a plane perpendicular to the axis 78 of the crankpin.

Conversely, the plate opening 104 is larger in size than the end 18 of the main shaft 12. As such, a clearance space 106 (FIG. 3) is provided between the end 19 of the main shaft 12 and the plate 100. Alternatively, however, the main shaft 12 is press fit into the plate 100 while a clearance space is provided between the crankpin 14 and its associated plate opening.

Figure 3:
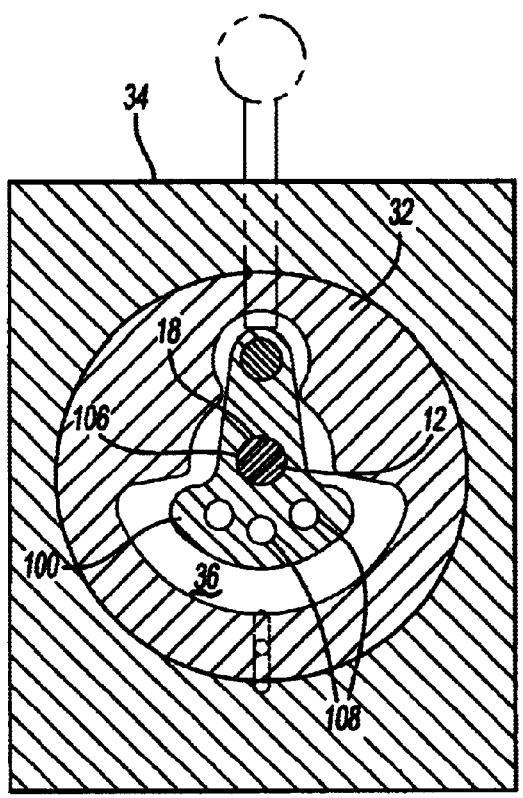
FIG. 3 is a sectional view taken substantially along line 3—3 in FIG. 2.
Figure 4:
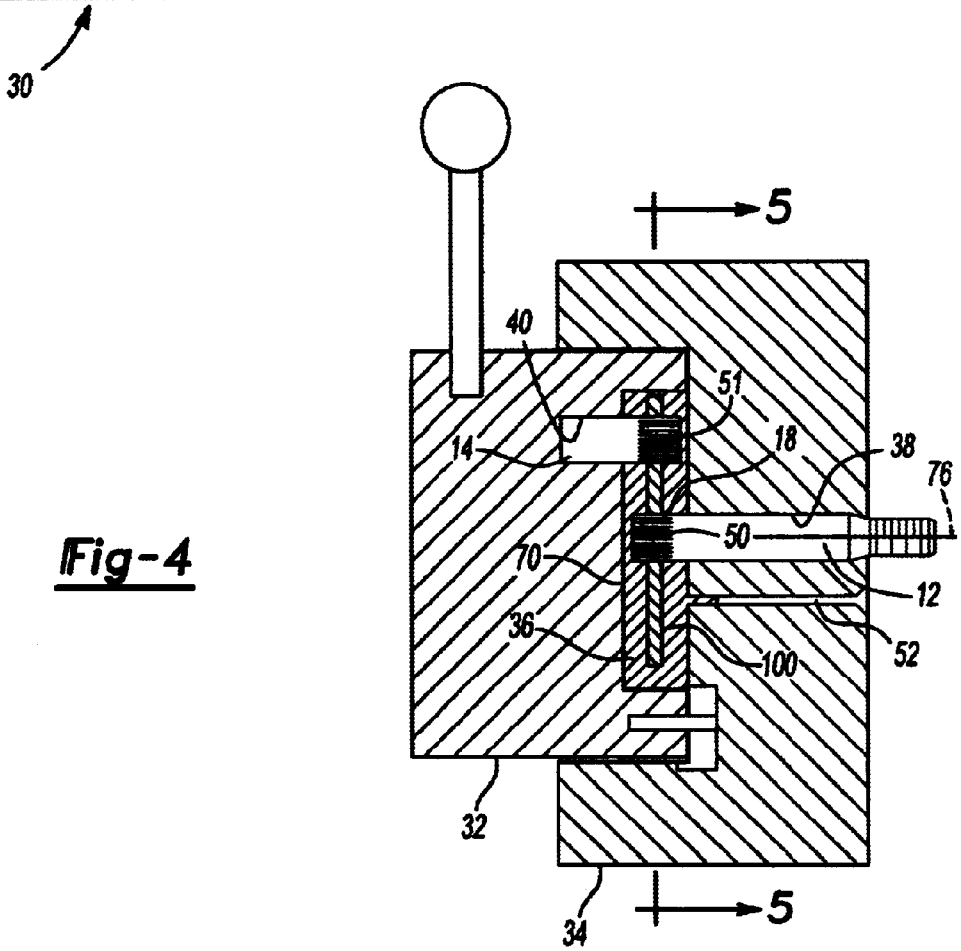
FIG. 4 is a view similar to FIG. 2 but illustrating a further step of the preferred embodiment of the present invention.

With reference now to FIGS. 2–4, the crankshaft 10 of the present invention is formed by casting the counterweight 16 from a thermosetting material 70 and preferably from liquid metal, such as zinc, by flowing the material 70 around the ends 20 and 18 of the crankpin 14 and 12, respectively, and such that the thermosetting material 70 encases the plate 100. As used in this patent, the term "thermosetting material" means of material that is solid at room temperature, but liquefies or melts at an elevated temperature above a temperature expected to be present within an internal combustion engine or compressor.

Still referring to FIGS. 2–4, as best shown in FIG. 2, a mold 30 has two mold halves 32 and 34 which are movable between their closed position, illustrated in FIG. 2, and an open position in which the mold halves 32 and 34 are spaced apart from each other. With the mold halves 32 and 34 in their closed position (FIG. 2), the mold halves 32 and 34 form a mold cavity 36 corresponding in shape to the counterweight 16.

With reference now particularly to FIGS. 2 and 3, the mold half 32 includes an elongated cylindrical positioning recess 40 adapted to receive the crankpin 14 such that the end 20 of the crankpin 14 is positioned within the mold cavity 36 and, similarly, such that the plate 100 is positioned within the mold cavity. Similarly, the mold half 34 includes a further cylindrical positioning recess 38 adapted to receive the main shaft 12 such that the end 18 of the main shaft 12 is positioned not only within the mold cavity 36, but through the second opening 104 in the plate 100. Simultaneously, the ends 20 and 18 of the crankpin 14 and main shaft 12, respectively, overlap and register with each other.

The positioning recesses 38 and 40 for positioning the main shaft 12 and crankpin 14, respectively, are machined in the mold halves 32 and 34 such that the recesses 38 and 40 are parallel to each other within very small tolerances. Furthermore, as best shown in FIG. 3, the mold half 32 is generally cylindrical in shape and pivotal about the axis of the main shaft 12 for a reason to be subsequently described.

Figure 5:
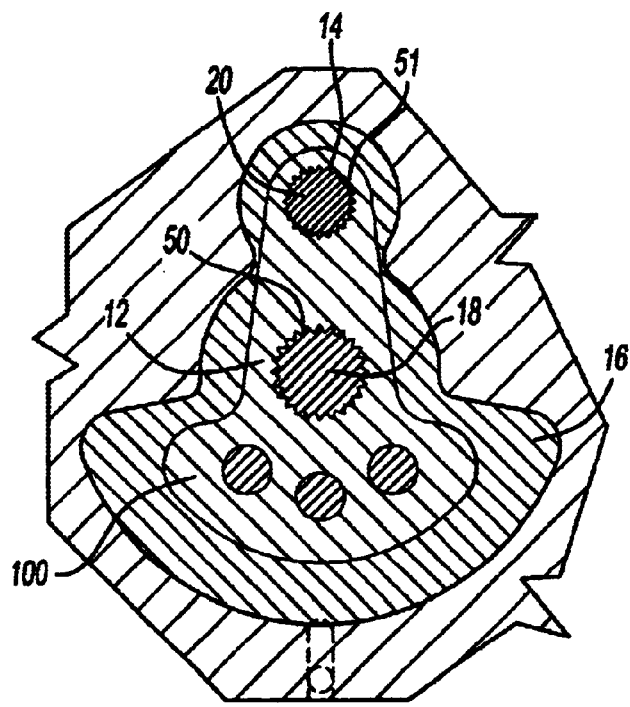
FIG. 5 is a sectional view taken substantially along line 5—5 in FIG. 4.

With reference now to FIG. 5, the ends 18 of the main shaft 12 include at least one indentation 50. The indentation 50 can comprise, for example, splines, a knurled portion, a polygonal cross section, or the like. In any event, as used herein, the term "indentation" means at least one cross section of the main shaft end 50 is non-circular in shape.

Still referring to FIG. 5, the end 20 of the crankpin 14 optionally includes at least one indentation 51 which is similar to the indentation 50 on the main shaft 12. Such indentations 51, i.e. a non-circular cross-sectional shape, may include splines, knurl, and/or the like. However, the end 20 of the crankpin 14 may also be circular in cross section and, thus, without any indentations 51.

With reference to FIGS. 2 and 3, it will be appreciated that the clearance space 106 provided between the plate 100 and the end 18 of the main shaft 12 enables limited angular as well as linear movement of the main shaft 12 relative to the crankpin 14 as the main shaft 12 and crankpin 14 are positioned within their respective positioning recesses 38 and 40 in the mold 30. As such, even if the plate 100 is skewed slightly with respect to the crankpin 14 following the press fit of the crankpin 14 into the plate 100, accurate parallelism and spacing between the main shaft 12 and crankpin 14 is still achieved once they are positioned within the mold 30.

With the main shaft 12 positioned in the mold half 34, the crankpin 14 positioned in the mold half 32, and the plate 100 positioned within the mold cavity 36 as shown in FIG. 2, the thermosetting material 70, such as liquid metal, preferably zinc, is introduced through a sprue 52 such that the liquid thermosetting material, preferably zinc, fills the mold cavity 36 which corresponds in shape to the counterweight 16. Simultaneously, the thermosetting material encases not only the ends 20 and 18 of the counterweight 14 and shaft 12, respectively, but also encases the plate 100. Furthermore, in order to enhance the mechanical connection between the thermosetting material and the plate 100, the plate 100 preferably includes one or more through holes 108 through which the thermosetting material flows prior to setting.

Any conventional means, such as pouring, injection molding or the like, can be used to introduce the liquid thermosetting material into the mold chamber 36. Furthermore, as shown in FIG. 4, the liquid material not only encases the registering ends 18 and 20 of the main shaft 12 and crankpin 14, respectively, as well as encasing the plate 100, but also flows into the indentations 50 and 51 formed in the shaft and crankpin ends 18 and 20. A small amount of the thermosetting material also hardens in the sprue 52 next to the mold chamber 46 upon cooling.

Figure 6:
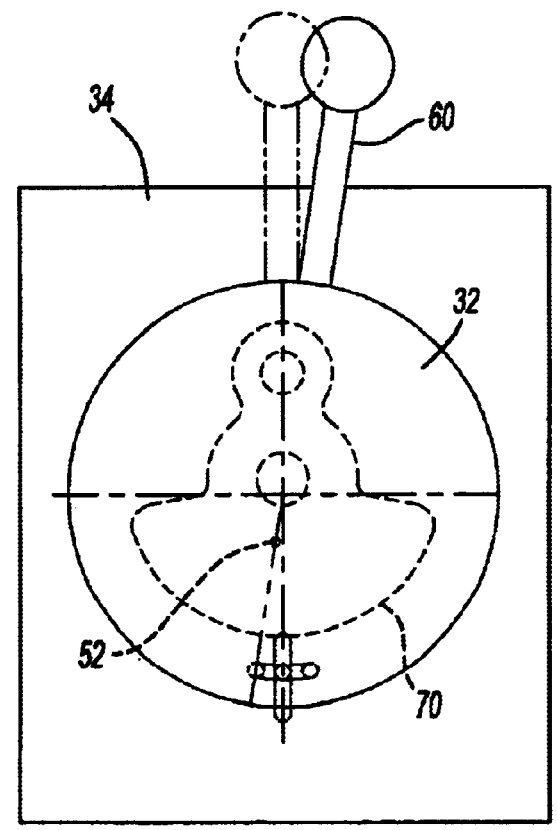
FIG. 6 is a diagrammatic view illustrating a further step of the preferred embodiment of the present invention.

With reference now to FIG. 6, once the liquid thermosetting material has set or cooled, a handle 60 attached to the mold half 32 pivots the mold half 32, as shown in phantom line, relative to the mold half 34 and, in doing so, breaks the set material contained in the sprue 52 from the counterweight 16. The mold halves 32 and 34 are then opened thus allowing the now completed crankshaft 10 to be removed from the mold 30. Furthermore, since the main shaft 12 and crankpin 14 were maintained parallel to each other during the entire molding operation, parallelism between the main shaft 12 and crankpin 14 is ensured upon completion of the crankshaft assembly.

The provision of the indentation(s) 50 on the end 18 of the main shaft 12 and, optionally, the indentation(s) 51 on the end 20 of the crankpin 14, ensures against movement, either rotational or longitudinal, of the main shaft 12 and crankpin 14 relative to the counterweight during operation of the crankshaft 12. Furthermore, the plate 100 encased within the counterweight 16 reinforces the counterweight 16 and thus enhances the overall structural strength of the counterweight 16, the attachment between the main shaft 12 and crankpin 14 and thus of the overall crankshaft 12.

With reference now to FIGS. 7 and 8, a modification of the crankshaft 110 of the present invention is shown in which the crankshaft 110 includes two counterweights 116. The counterweights 116 are attached to opposite ends of a crankpin 114 while the main shaft 112 includes two aligned main shaft sections 113. Each main shaft section 113 furthermore, is secured to one of the counterweights 16.

Each counterweight 116 is formed in the previously described fashion, i.e. by molding a thermosetting material around the registering ends of the crankpin 114 and main shaft sections 113 as well as encasing the reinforcing plate 100 in each counterweight 116. As such, a further description is unnecessary.

With reference now to FIGS. 9 and 10, a still further modification of the present invention is shown in which one end 20 of the crankpin 14 is press fit into a plate 200. The end 20 of the crank pin optionally includes indentations 51.

Unlike the embodiment of the invention illustrated in FIGS. 7 and 8, however, the plate 200 terminates short of surrounding the end 18 of the main shaft 12. Instead, the inner radial end 202 of the plate 200 includes an arcuate surface 204 which overlies approximately one half of the main shaft 20. As before, the thermosetting material encases the overlying ends 18 and 20 of the main shaft 12 and crankpin 14, respectively, as well as the plate 200 to form the counterweight 116. The plate 200 thus reinforces the connection between the crankpin 14 and counterweight 116 to thereby prevent elongation of the crankpin hole in the counterweight 116 during operation of the engine or compressor.

From the foregoing, it can be seen that the present invention provides both a crankshaft and method for constructing a crankshaft which is not only inexpensive, but also ensures a high degree of parallelism between the main shaft and crankpin upon completion of the assembly.

Having described my invention, however, many modifications thereto will become apparent to those skilled in the art to which it pertains without deviation from the spirit of the invention as defined by the scope of the appended claims.

I claim:

1. A crankshaft comprising:

a shaft solid in cross section and having two ends and an axis, said shaft adapted to rotate about said shaft axis, a crankpin solid in cross section and having two ends and an axis parallel to and radially spaced from the shaft axis, at least one of said shaft or said crankpin having at least one indentation, a plate having two spaced openings, one end of said shaft being positioned in one of said plate openings and one end of said crankpin being positioned in the other plate opening, at least one counterweight extending between said one end of said shaft and said one end of said crankpin, said counterweight being formed by casting a liquid thermosetting material around said one end of said shaft and said crankpin and around said plate, wherein said liquid material fills said indentation and, upon hardening, locks said counterweight to said crankpin and said shaft and encases said plate.

2. The invention as defined in claim 1 wherein said one end of said crank pin is press fit into said other opening of said plate.

3. The invention as defined in claim 2 wherein said one plate opening is larger in size than said one end of said shaft.

4. The invention as defined in claim 1 wherein said indentation comprises a spline.

5. The invention as defined in claim 1 wherein said liquid material comprises zinc.

6. The invention as defined in claim 1 wherein said plate includes at least one through hole.

* * * * *